(12) United States Patent
Ayash et al.

(10) Patent No.: US 6,418,282 B1
(45) Date of Patent: Jul. 9, 2002

(54) INTEGRAL PLENUM PANEL

(75) Inventors: Karl B. Ayash, Webster; Robert H. Alexander, Jr., Fairport; Thomas C. Hollar, Penfield; Randall E. Kaufman, Rochester; Karen D. Reid, Walworth; Donald C. Koch, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/714,974

(22) Filed: Nov. 20, 2000

Related U.S. Application Data

(60) Provisional application No. 60/200,871, filed on May 1, 2000.

(51) Int. Cl.[7] .............................................. G03G 21/20
(52) U.S. Cl. .......................................... 399/92; 399/107
(58) Field of Search ................................ 399/91, 92, 93, 399/107, 110, 98

(56) References Cited

U.S. PATENT DOCUMENTS 5,424,806 A * 6/1995 Siegel .......................... 399/92
5,634,176 A * 5/1997 Ayash et al. .................. 399/92

\* cited by examiner

*Primary Examiner*—Sophia S. Chen
*Assistant Examiner*—Hoang Ngo
(74) *Attorney, Agent, or Firm*—Oliff & Berridge, PLC

(57) ABSTRACT

An exterior or interior structural member in the form of a panel for an image forming or similar device is disclosed which has an integral plenum passage for fluid/air. The panel may be thermoformed and/or have mechanically connected parts, and may include other elements, such as toner bottle covers.

18 Claims, 12 Drawing Sheets

VIEW A-A

SECTION A-A

SECTION A-A

SECTION B-B

INTEGRAL PLENUM PANEL

This application claims the benefit of U.S. Provisional Application No. 60/200,871, filed on May 1, 2000.

BACKGROUND OF THE INVENTION

1. Field of Invention

This invention relates to fluid flow passages provided in a mechanical or electromechanical apparatus.

2. Description of Related Art

Many different devices, for example, computers, photocopiers, facsimile machines, telephones, printers, multifunction devices, and the like, circulate air or other ambient fluids or gases to vary the operating temperature of components in those devices and/or to remove contaminants. Typically, one or more individual fluid passages are found in such devices to bring the ambient fluids/gases to, and away from, various device components. The ambient fluid/gas provides cooling or provides heating to prevent condensation, and/or removes contaminants, such as moisture or toner particles. Often there are flow directing devices or structures, such as louvers or vanes, pipes or ducts associated with these fluid/gas passages, and blowers or compressors or accumulator tanks which may be connected to each individual fluid/gas passage for fluid transport.

SUMMARY OF THE INVENTION

Problems associated with such fluid/gas passages include finding room to fit the fluid/gas passages in the device without making access to the fluid/gas passages for servicing or repair difficult, and avoiding damaging the fluid/gas passages just in fitting the fluid/gas passages into the device. Also, in many such devices, since access to components is readily available to both users and technicians, safety concerns arise in case a fluid/gas passage breaks, or electrical components are accidentally contacted in the course of servicing or repair of the fluid/gas passages.

The invention is directed to a device which enables the movement of a fluid, especially air, throughout an electronic device, such as, for example, an image forming or similar device, using structural members of the device having one or more integral plenum chambers or fluid/gas passages. The structural member, which may be constructed in many ways, is cost effective, and will improve reliability throughout the electronic device, as well as reduce servicing costs. In one exemplary embodiment the structural member may be made using a blow molding process in which "tack-offs" are formed to define integral plenum chambers. In another exemplary embodiment, the structural member may be made using a thermoforming process in which ribs are formed in one structural member portion and the ribbed structural member is joined with another structural member portion, such as, for example, by any appropriate known of later developed joining technology, including, for example, adhesive joining, ultrasonic welding, and/or mechanical fastening, such as, for example, by using screws. In another exemplary embodiment, the structural member is made up of two or more portions using an injection molding process, and the structural member portions are joined together, such as, for example, by any appropriate known or later developed joining technology, including for example, adhesive joining, ultrasonic welding, and/or mechanical fastening, such as, for example, by using screws. The structural member may be used in the form of an inner or outer cover for a device such as a personal computer, photocopier, facsimile machine, printer, telephone or multifunction device. The integral construction increases the strength of the cover and provides a compact, efficient device for circulating air or other ambient fluids or gases for cooling, heating, cleaning, or the like, throughout an electronic device. A multifunction device is considered to be an electronic device which performs several different functions, such as photocopiers, printers, facsimile devices, voice telecommunication devices, and the like.

This invention provides one or more robust plenum fluid/gas passages integrated in structural members such as, for example, a cover of an image forming device, a computer, a printer, a facsimile machine, a multifunction device.

In various exemplary embodiments, the integrated plenum fluid/gas passages provide an ambient fluid, usually air, to and from the components of the device. In various exemplary embodiments the integrated plenum fluid/gas passages are typically used to cool components of the device or to remove contaminants from the device.

In various exemplary embodiments of the device, the structural member may also be employed as a safety barrier and may have other elements integrated into the structural member, such as, for example, a toner cover.

In one exemplary embodiment of the integrated fluid/gas passages of the invention, an exterior cover of an image forming device includes an integrally formed air supply/exhaust plenum duct.

In another exemplary embodiment of this invention, a multi-functional inner panel of an image forming device has an integrally formed air supply/exhaust plenum duct.

In another exemplary embodiment of this invention, an inner safety panel of an image forming device includes both toner dispenser bottle covers and an air supply/exhaust plenum duct formed in the inner safety panel.

These and other features and advantages of this invention are described in or are present from the following detailed description of various devices that incorporate various exemplary embodiments of the integrated fluid/gas passages according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
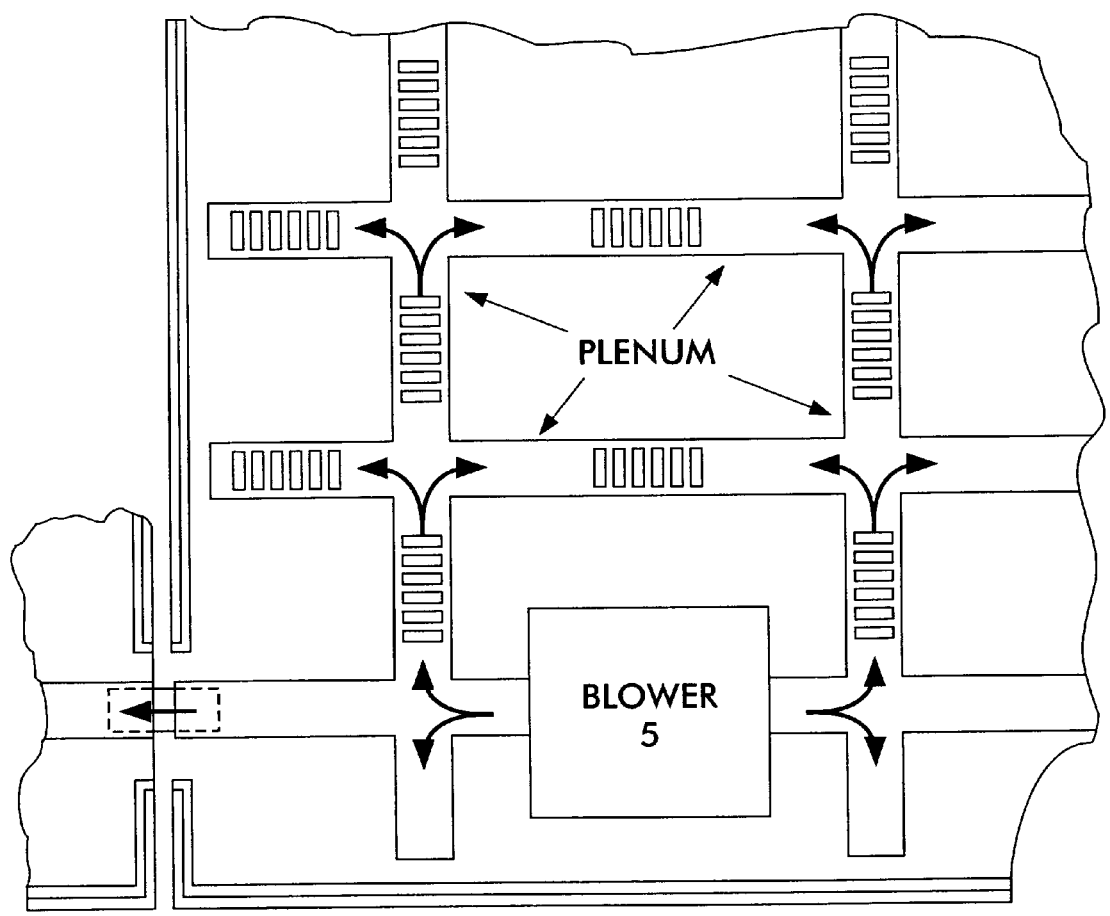
FIG. 1 is a plan view of one exemplary embodiment of a structural member incorporating one exemplary embodiment of the integral fluid/gas passage according to this invention.

FIG. 1 is a plan view of one exemplary embodiment of a structural member incorporating one exemplary embodiment of the integral fluid/gas passage according to this invention. The structural member 1 includes a plurality of intersecting plenum fluid/gas passages 11. Each passage 11 has openings through which air or another ambient fluid flows to or from a device, such as, for example, an image forming or similar device that incorporates the structural member 1. A blower 5 is attached to an opening 12 in an inside wall 3 of the structural member 1. The blower may also be located at a position which is external to the structural member 1 and connected to the plenum passages 11 by an opening in the outside wall 2 of the structural member 1.

Figure 2:
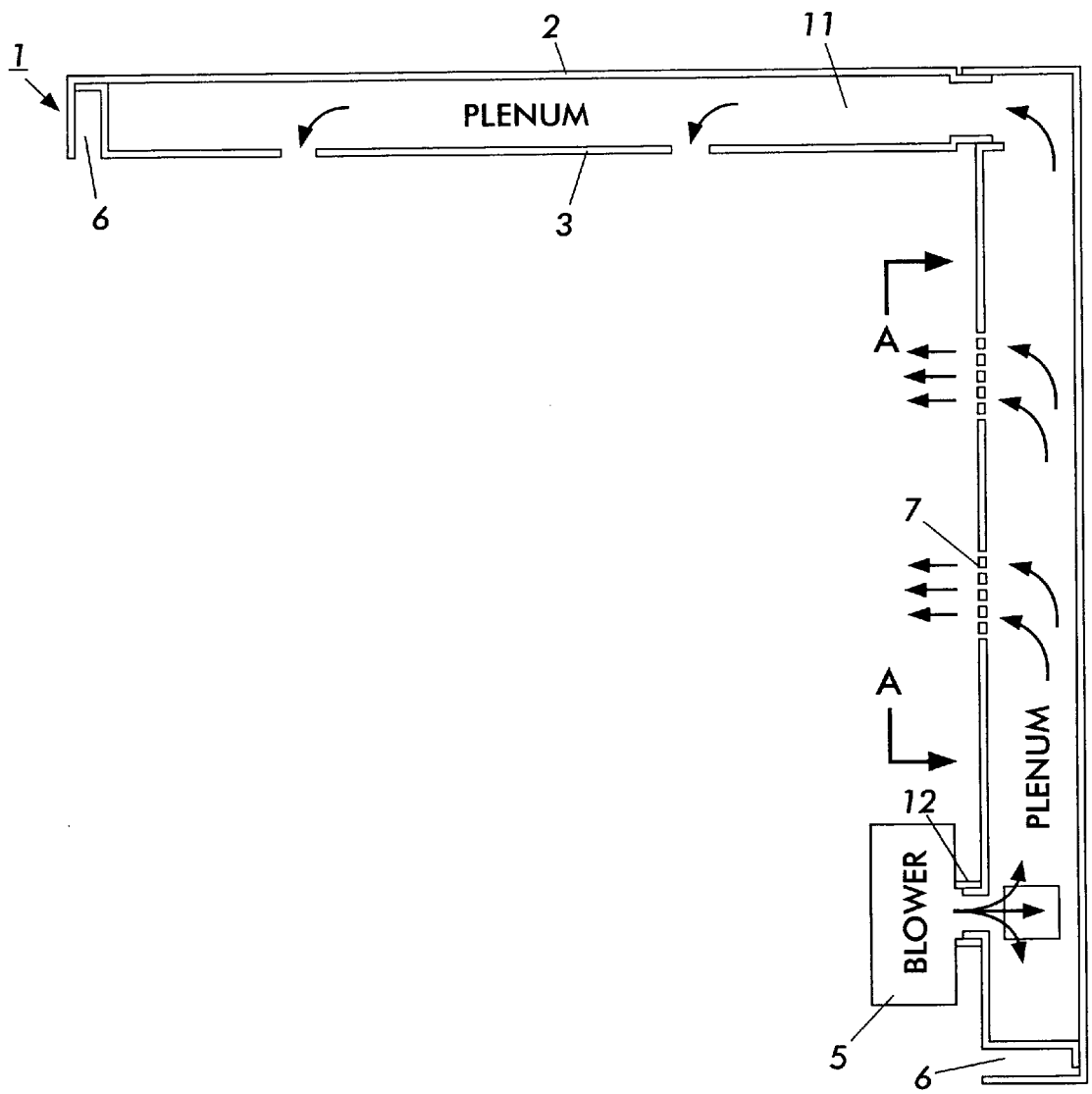
FIG. 2 is a side view of the first exemplary structural member.

FIG. 2 is a side view of a structural member 1 with the integral plenum fluid/gas passage 11 that supplies air to, or exhausts air from, the inside of a device to which the structural member 1 may be attached. The structural member 1 has an inside wall 3 and outside wall 2. FIG. 2 shows two relatively long ribs or "tack-offs" 6 that are employed to impart structural rigidity to the integrated structural member 1 and to form the plenum passages 11. The number of "tack-offs" may vary depending on different factors, for example, on the strength desired for the structural member, and/or on the number of plenum passages 11 desired.

Figure 3:
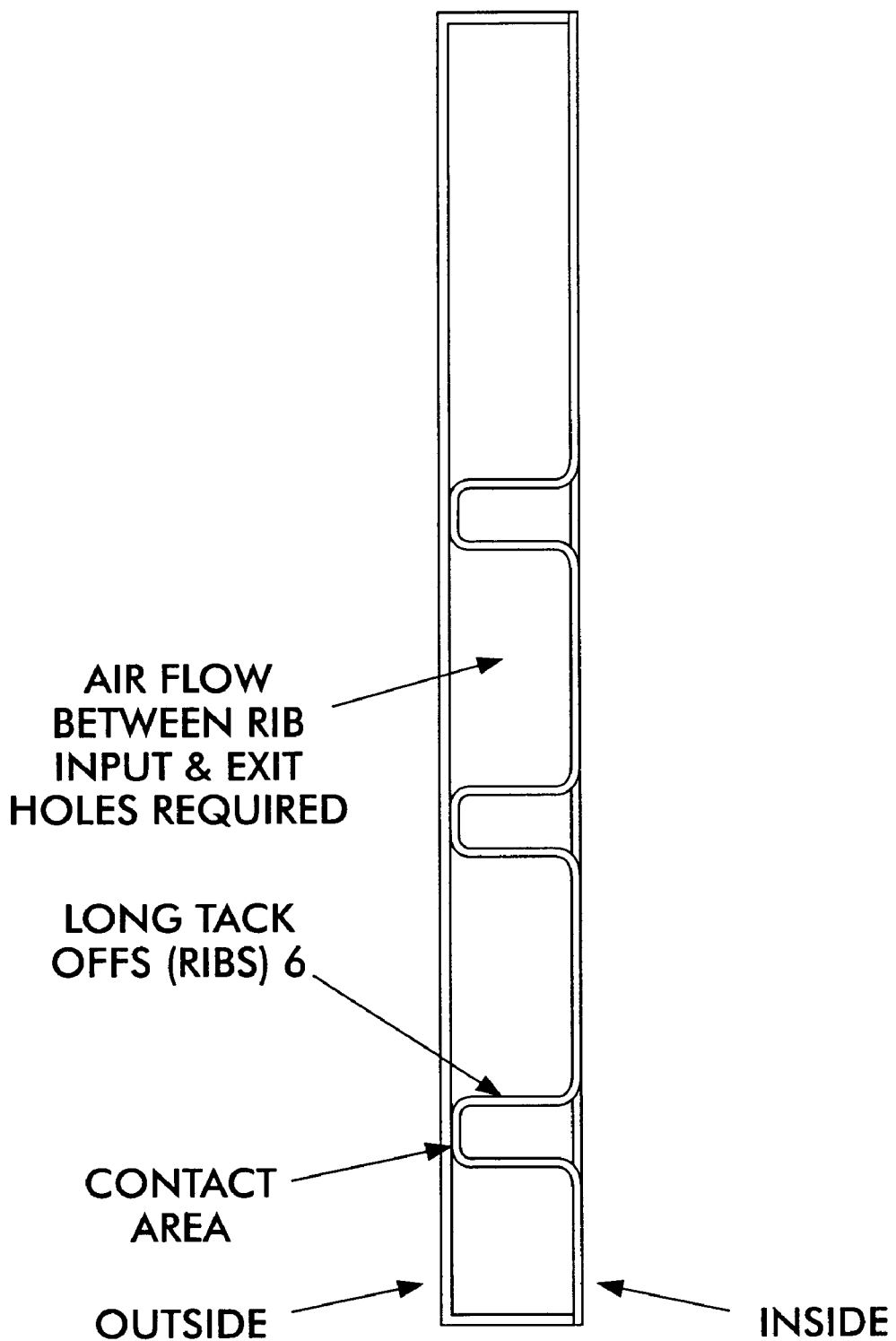
FIG. 3 is cross-sectional view of the first exemplary structural member.

FIG. 3 shows the ribs or long tack-offs 6 with a U-shaped cross section. The closed curved portion of the U-shaped tack-offs 6 contacts the outside wall 2 of the structural member 1. The open end of the U-shaped tack-offs 6 face inward and constitute openings in the inside wall 3 of the structural member 1. This particular embodiment of the structural member is shown as a unitary blow-molded version. However, it may be made up of separate portions made, such as, for example, by thermoforming or injection molding technology, and joined together by conventional known or later developed technology, such as, for example, using adhesives, ultrasonic welding and/or mechanical fasteners. Air flows between the ribs or tack-offs 6.

Figure 4:
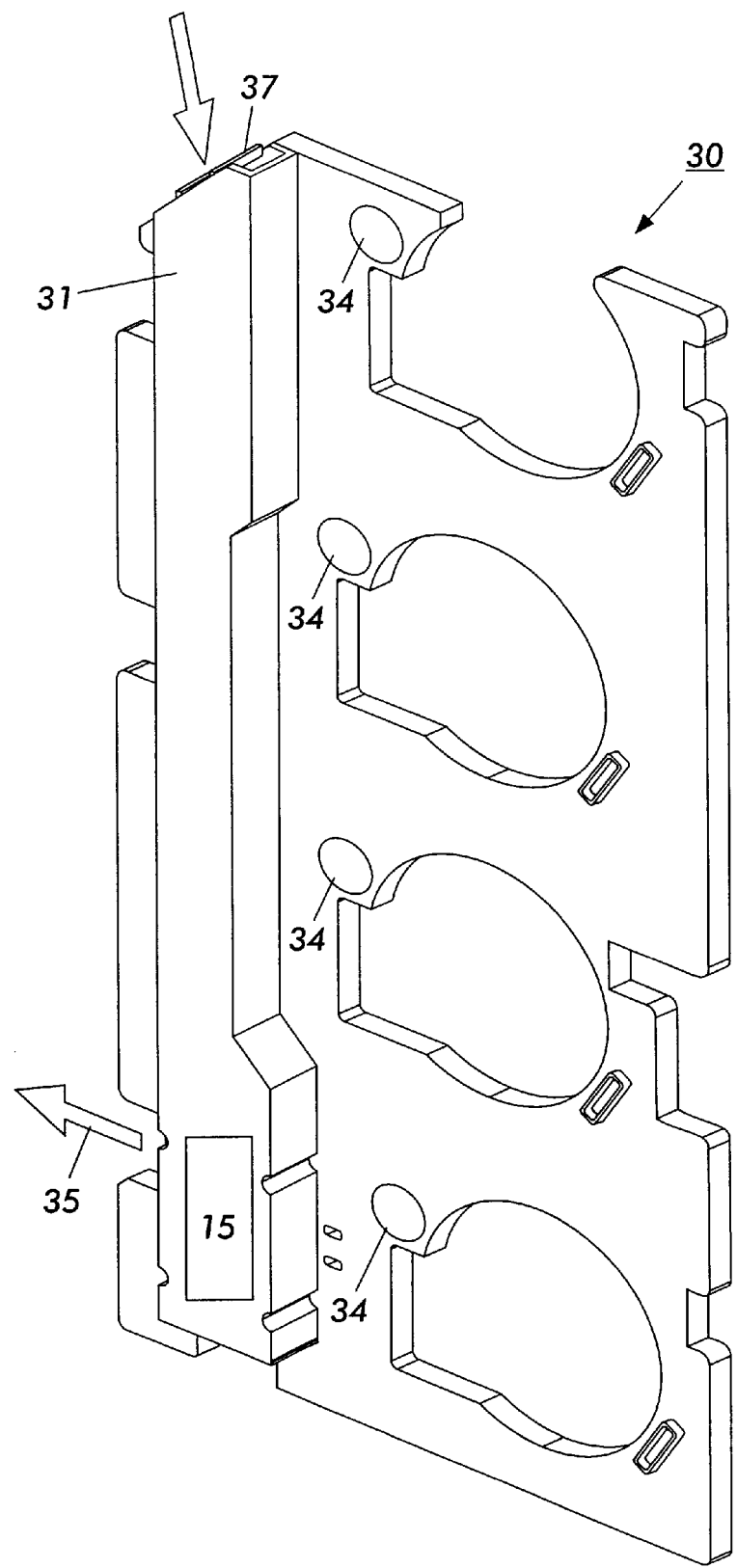
FIG. 4 is a perspective view of one side of a first portion of a second exemplary structural member incorporating a second exemplary embodiment of the integral fluid/gas passage according to this invention.
Figure 8:
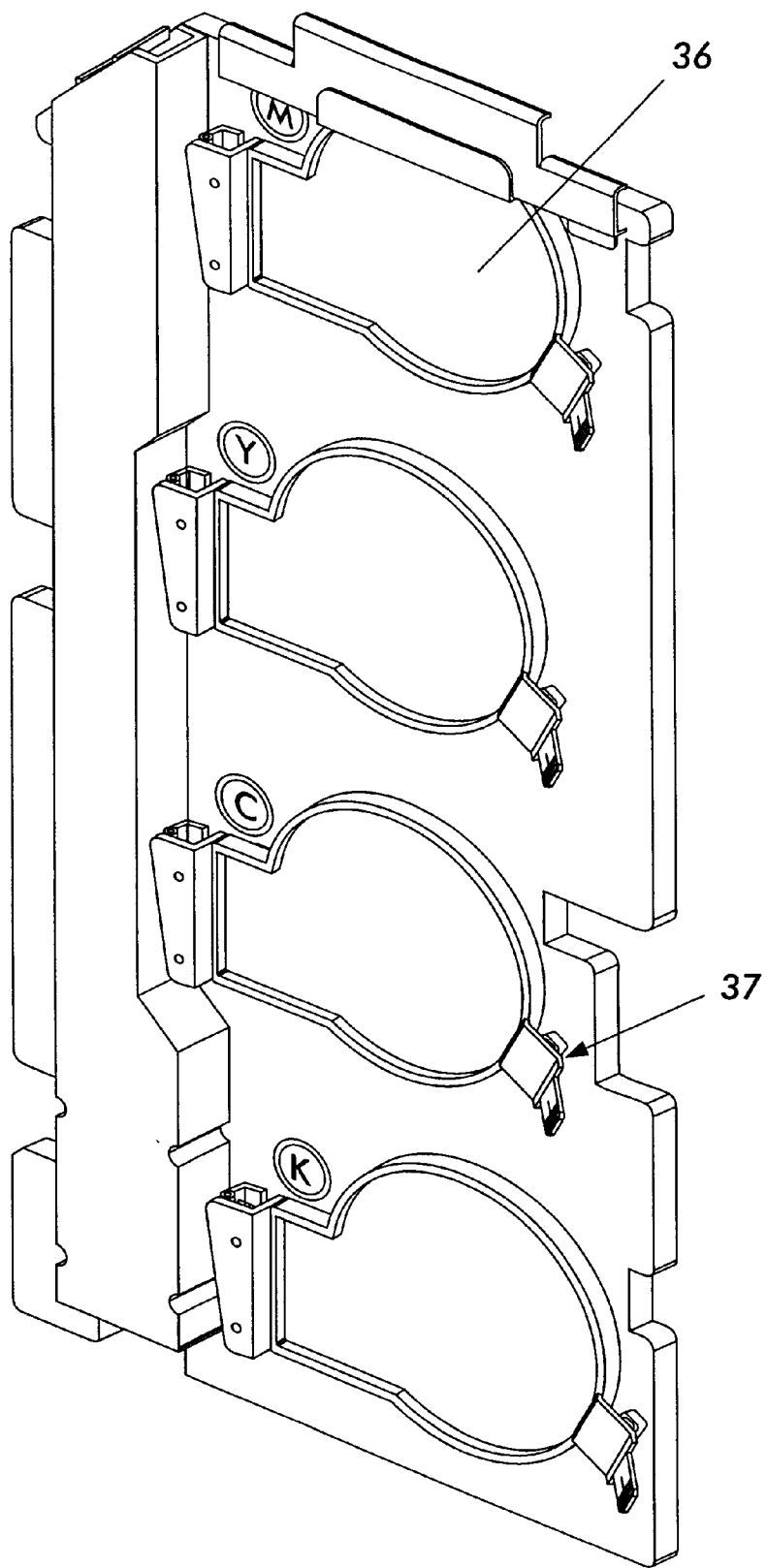
FIG. 8 is a another perspective view of the second exemplary structural member.

FIG. 4 is a perspective view of a second exemplary structural embodiment of a second structural member 30. The second structural member or panel 30 is provided inside of an image forming or similar device, and is specifically designed to provide access to toner containers, e.g. toner bottles, in an organized manner. The structural member or panel 30 contains a number of lids 36 (as shown in FIG. 8) for toner containers, and has label locations 34 to attach labels to the panel 30 to identify the toner in each container. An air duct 31 is integrally connected to or formed as part of the panel 30. The air duct has an air inlet 37 and an air exhaust outlet (not shown in FIG. 4) on the other side of the panel 30 from the air inlet 37. An arrow 35 labeled air exhaust indicates the direction of flow of air exhausted via the duct 31. These directions of air exhaust and air inlet are for purposes of illustration only and they may be reversed in actual operation. The panel also contains an instruction label location 15, on the plenum passage 31 for supporting an instruction label. In various exemplary embodiments, the panel 30 acts as a safety panel because the panel 30 provides a barrier to access to image forming device components, such as toner containers, electronic equipment, and hot surfaces for the safety of users of the device by reducing the chance of accidental contact by users with those components.

Figure 5:
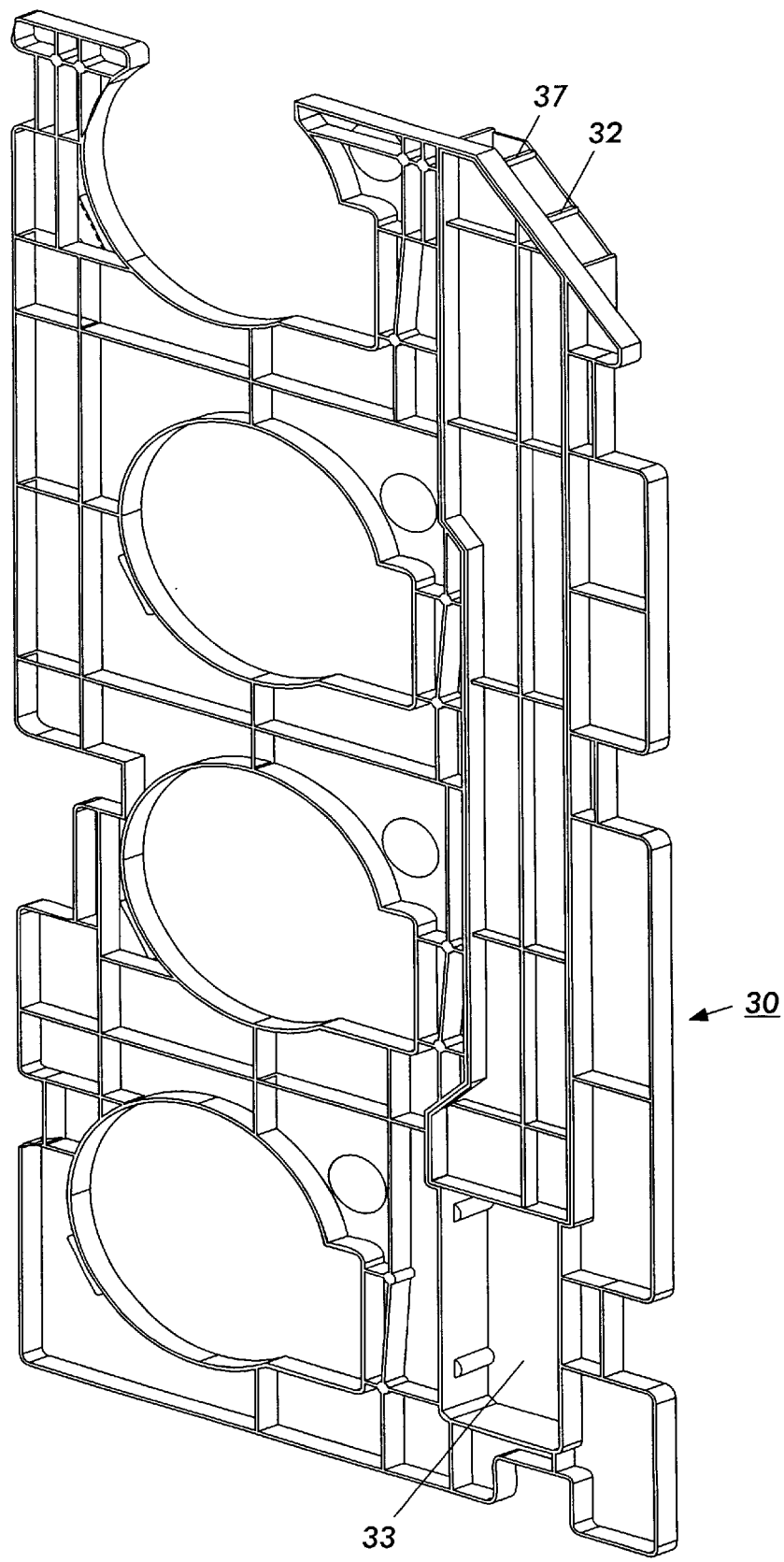
FIG. 5 is a perspective view of a second portion of the second exemplary structural member.

FIG. 5 is a perspective view of a second side of the second exemplary structural member 30, revealing its ribbed support structure, and the ribs 32 supporting the integral plenum passage 31, and the plenum passage opening 33. Air flows through the integral plenum passage 31 via the opening 37 near ribs 32 and via the opening 33 in the structural member 30.

Figure 6:
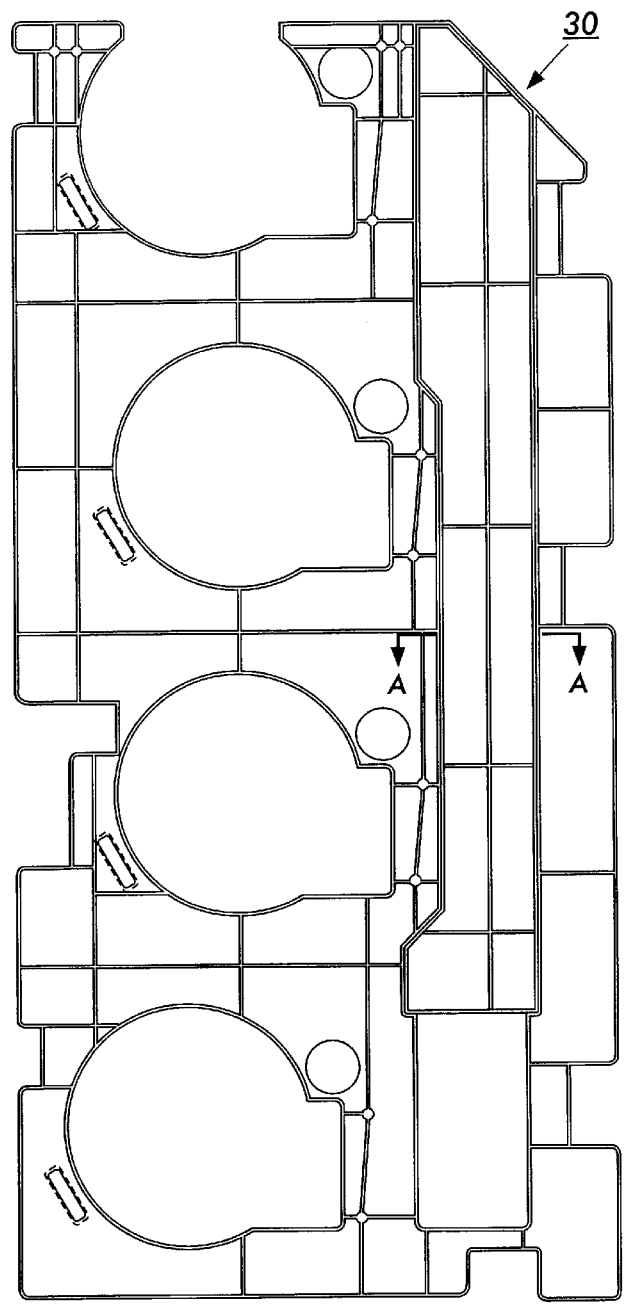
FIG. 6 is a plan view of the first side of the second exemplary structural member.
Figure 7:
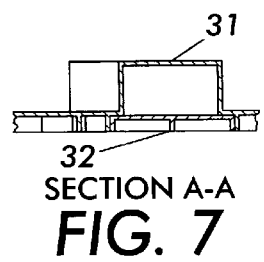
FIG. 7 is a cross-sectional view of the second exemplary structural member.

FIG. 6 shows a plan view of the second side of the second exemplary structural member 30. FIG. 7 shows the second exemplary embodiment structural member panel is shown in cross section. In FIG. 7, the section is taken along line A—A in FIG. 6. FIG. 7 depicts the cross section of the supporting ribs 32 as well as the cross section of the plenum passage 31. FIG. 8 shows the second exemplary structural member with hinged toner lids 36 having latching/unlatching elements 37.

Figure 9:
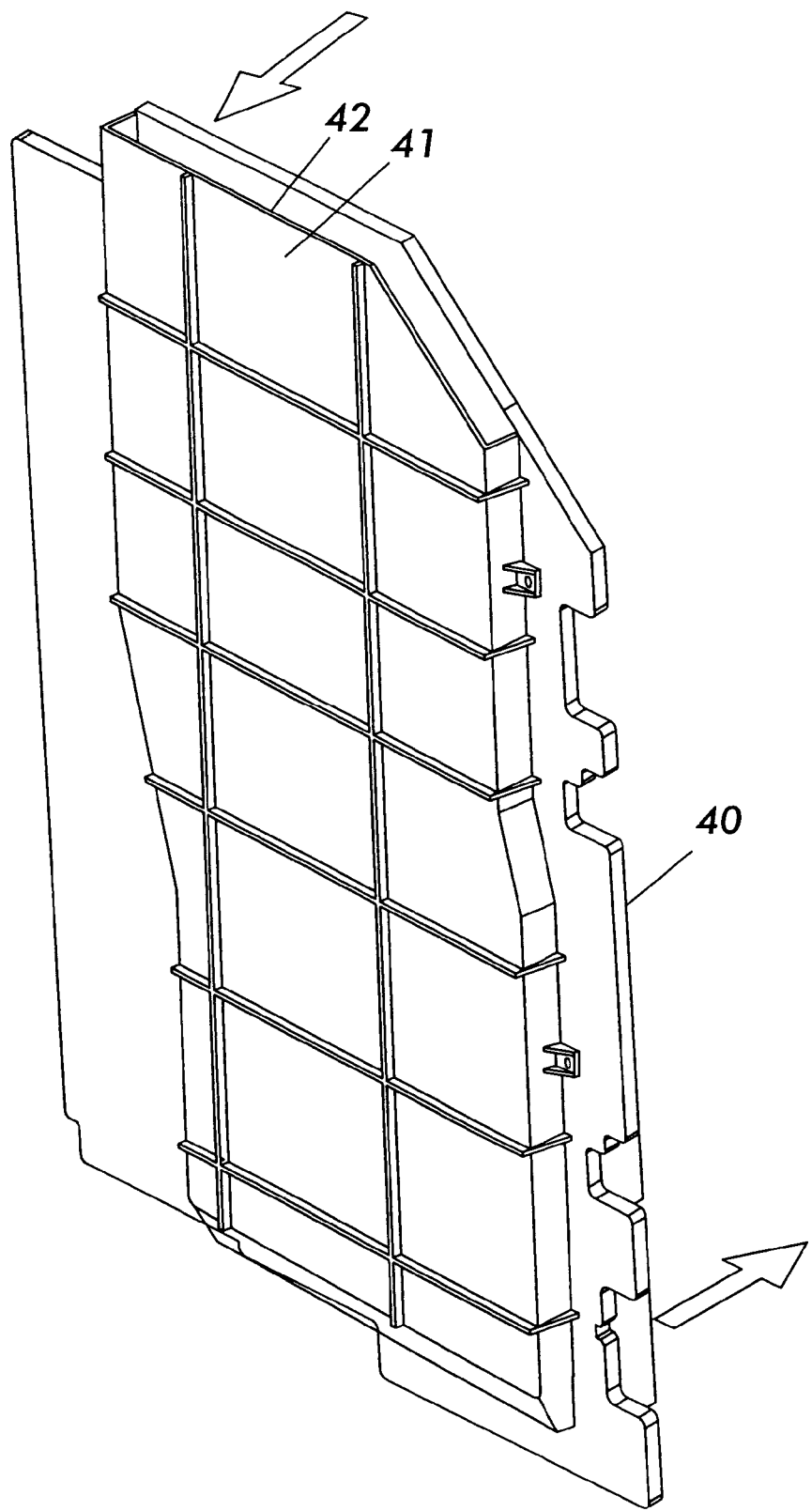
FIG. 9 is a perspective view of a third exemplary embodiment of a structural member incorporating a third exemplary embodiment of the integral fluid/gas passage according to this invention.

FIG. 9 shows a perspective view of a first side of a third exemplary embodiment, of a third structural member or panel 40 of an image forming or similar device which has an integrated air plenum passage 41 having an air inlet 42. The directions indicated in the drawing for air entering the integrated plenum passage 41 and air being exhausted from the integrated plenum passage 41 may be reversed in actual operation. The integral plenum passage 41 is formed, as shown, on one side of the panel 40 communicates with an opening connected to the plenum so that air can be transmitted from one side of the panel 40 to the other side. Alternatively, the passage 41 may have another outlet which does not communicate with an opening in the panel or in conjunction with the opening.

Figure 10:
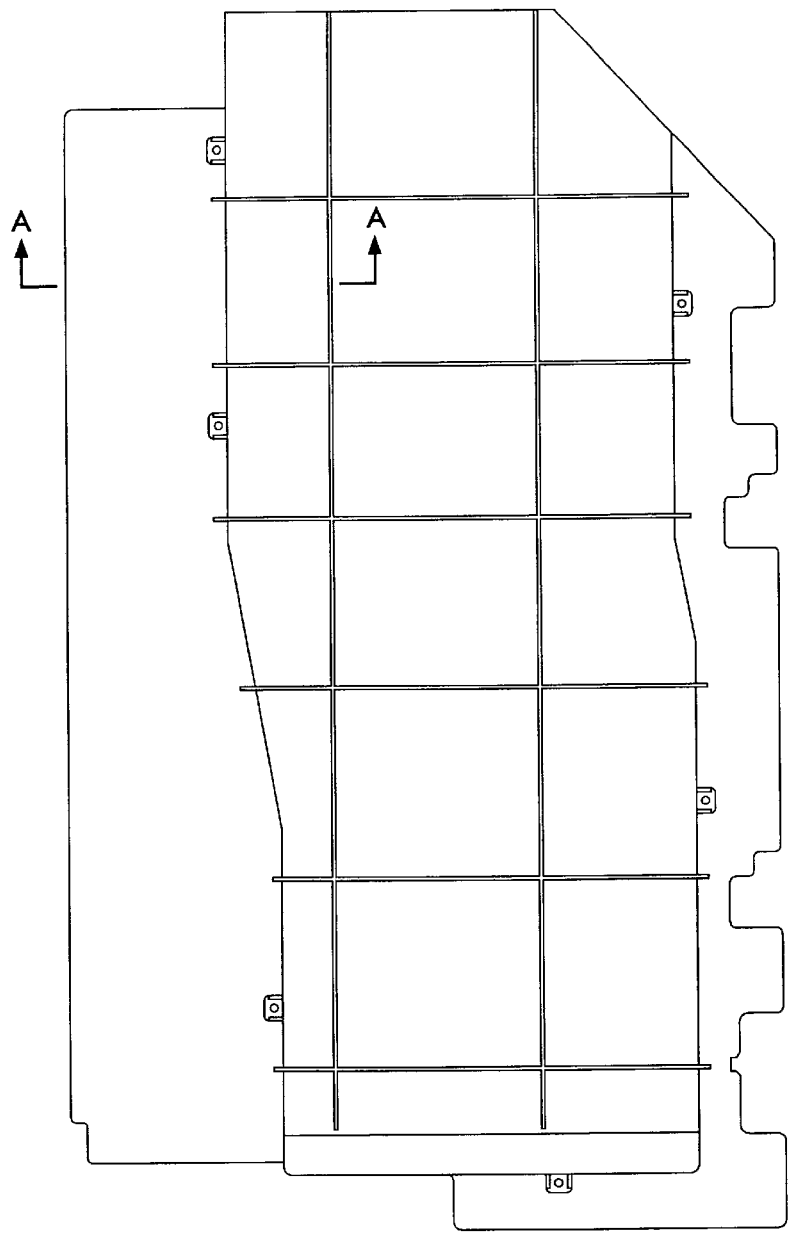
FIG. 10 is a plan view of a top or first side of the third exemplary structural member.
Figure 11:
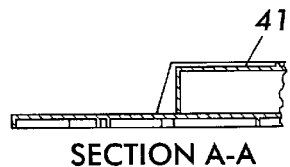
FIG. 11 is a first cross-sectional view of the third exemplary structural member.

FIG. 10 shows a plan view of a first side of the third exemplary structural member 40. FIG. 11 shows a cross-sectional view of the third exemplary structural member 40. In FIG. 11, the section is taken along line A—A in FIG. 10. FIG. 11 shows the cross section of the supporting element 42 as well as the cross section of the plenum duct 41.

Figure 12:
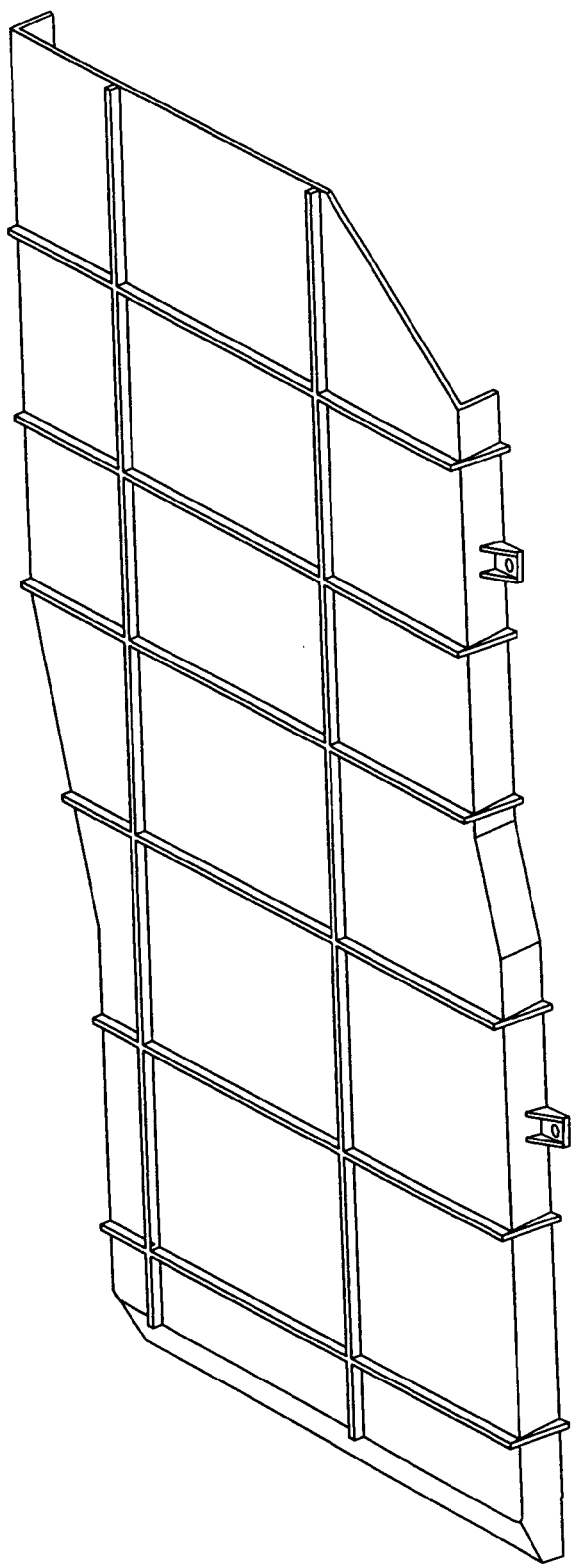
FIG. 12 is a perspective view of the third exemplary fluid/gas passage portion separated from the third exemplary structural member.

FIG. 12 is a perspective view of the third exemplary third gas passage separated from the third exemplary structural member 40 showing the plenum passage 41 as a separate element prior to its being integrally connected to the third structural member 40.

Figure 13:
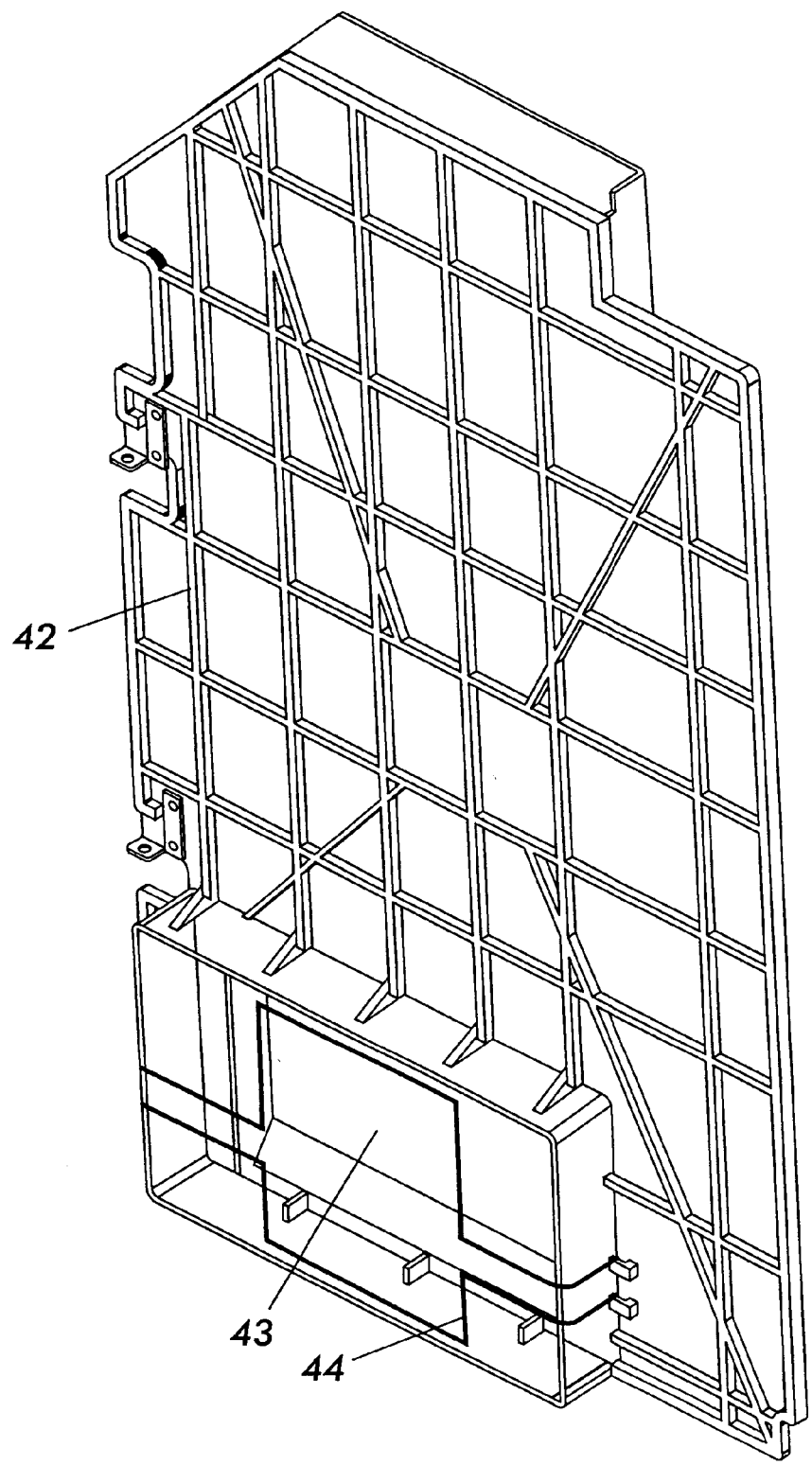
FIG. 13 is a perspective view of a second or bottom side of the third exemplary structural member.

FIG. 13 shows the underside of the third exemplary structural member 40 showing the support element 42 structure, the air outlet 43 formed in the panel 40 that communicates with the integral plenum duct 41, and a frame 44 for supporting auxiliary equipment such as a filter. In various exemplary embodiments, the third exemplary structural member can also act as a safety panel because the third exemplary structural member provides a barrier to access to image forming device components, such as toner containers, electronic equipment, and hot surfaces for the safety of users of the device by reducing the chance of accidental contact by users with those components.

Figure 14:
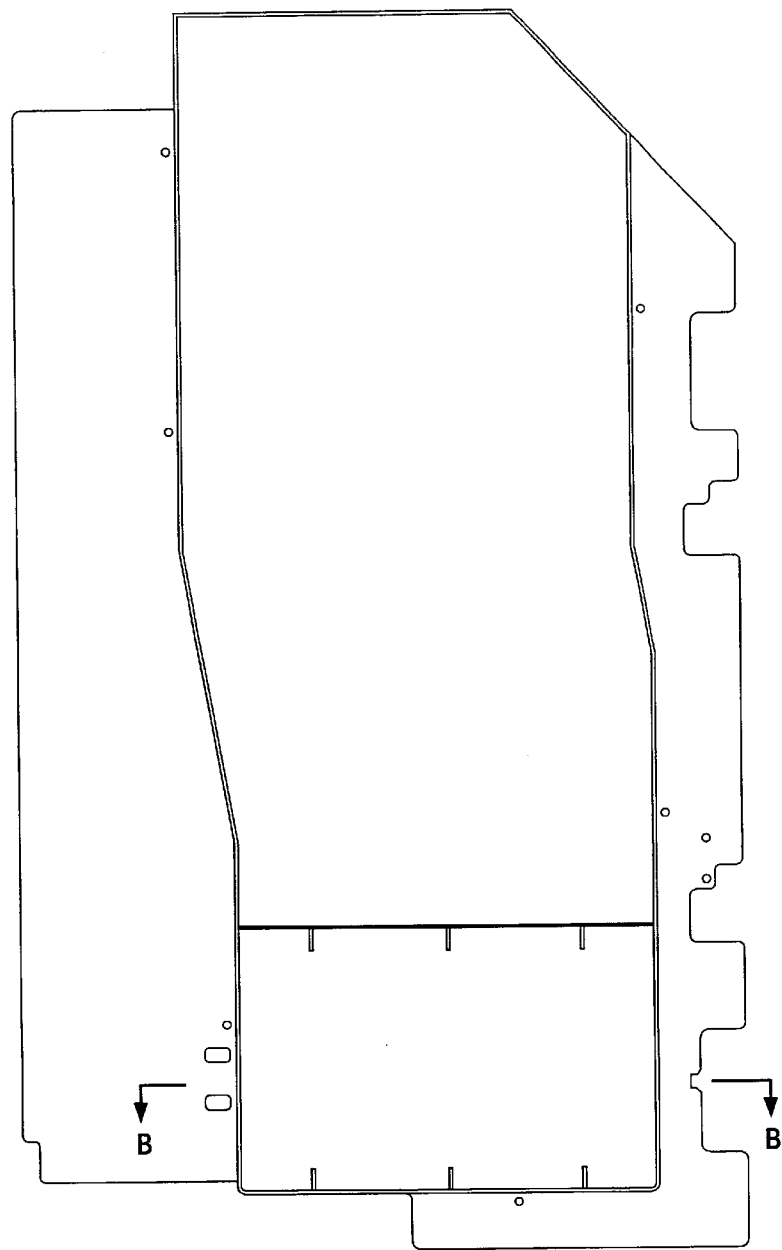
FIG. 14 is a plan view of the first side of the third exemplary structural member.
Figure 15:
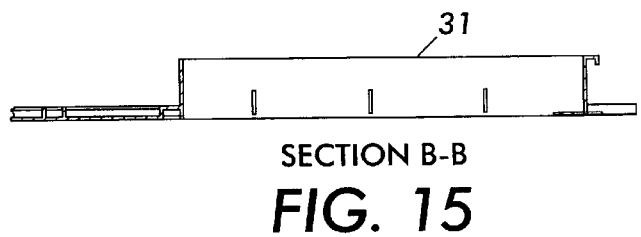
FIG. 15 is a second cross-sectional view of the third exemplary structural member.

FIG. 14 is a plan view of the first side of the third exemplary structural member, and FIG. 15 is a section taken along line B—B of the third exemplary structural member, which shows air passage 31 in detail.

In the various exemplary embodiments described above, the panels may be formed by any suitable methods, including blow molding, thermoforming, and injection molding, alone or in combination with conventional joining technology, such as, for example, adhesive, ultrasonic and/or mechanical assembly methods.

While this invention has been described in conjunction with the exemplary embodiments set forth above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A fluid/gas passage structure, comprising:
    a structural member having a first side wall and an opposing side wall;
    a plurality of fluid/gas passages integrally formed in the structural member separated and defined by at least one elongated rib in the structural member.

2. The fluid/gas structure of claim 1, further comprising a device incorporating the structural member as a structural element of the device.

3. The fluid/gas structure of claim 2, wherein the structural member is an exterior structural element of the device.

4. The fluid/gas structure of claim 2, wherein the structural member is a safety panel of the device.

5. The fluid/gas structure of claim 4, wherein the safety panel minimizes accidental contact with at least one component of the device.

6. The fluid/gas structure of claim 2, wherein the device is an image forming device.

7. The fluid/gas structure of claim 2, wherein the device is one of a photocopier, a digital photocopier, a facsimile machine, a multifunction device, a scanner, a printer, a laser printer, an ink jet printer, a telephone communication device.

8. The fluid/gas structure of claim 1, wherein the structural member includes at least one opening in communication with the fluid/gas passage.

9. The fluid/gas structure of claim 8, wherein at least one of the at least one opening has extended sides.

10. The fluid/gas passage of claim 1, further comprising louvers or vents located in the fluid/gas passage.

11. The fluid/gas passage of claim 1, further comprising a blower attached to the fluid/air passage.

12. A printer, comprising:
    a printer;
    an interior structural member of the printer having a first side wall and an opposing side wall: and
    a plurality of fluid/air passages comprising an integral part of the interior structural member and separated and defined by at least one elongated rib in the structural member.

13. An image forming device, comprising:
    an exterior member of the image forming device having an inside wall and an outside wall;
    a plurality of fluid/gas passages separated by at least one elongated rib and integrally formed in the exterior member.

14. The image forming device of claim 13, wherein at least one elongated rib forms a side wall of the fluid/gas passage.

15. An image forming device, comprising:
    an interior cover for the image forming device in the form of a panel; and
    a fluid/air passage comprising an integral part of said panel.

16. A device having a fluid/gas passage structure as a structural element thereof, comprising:
    a structural member having a first side wall and an opposing side wall;
    a plurality of fluid/gas passages integrally formed in the structural member and separated and defined by at least one elongated rib in the structural member; and
    wherein the structural member is an interior structural member of the device.

17. An image forming device comprising:
    at least one toner bottle;
    a fluid gas passage structure having a structural member which includes, for each toner bottle, an opening that communicates with that toner bottle; and
    a fluid gas passage integrally formed within the structural member.

18. The device of claim 1, wherein at least one elongated rib is in the form of a tack-off.

* * * * *